(12) United States Patent
Han

(10) Patent No.: US 10,030,345 B1
(45) Date of Patent: Jul. 24, 2018

(54) DISPOSABLE PET EXCREMENT COLLECTOR

(71) Applicant: Dong Han, Guangdong (CN)

(72) Inventor: Dong Han, Guangdong (CN)

( * ) Notice: Subject to any disclaimer, the term of this patent is extended or adjusted under 35 U.S.C. 154(b) by 0 days.

(21) Appl. No.: 15/671,125

(22) Filed: Aug. 7, 2017

(51) Int. Cl.
*E01H 1/12* (2006.01)
*A01K 29/00* (2006.01)

(52) U.S. Cl.
CPC ........... *E01H 1/1206* (2013.01); *A01K 29/00* (2013.01); *E01H 2001/126* (2013.01)

(58) Field of Classification Search
CPC ........... E01H 1/1206; E01H 2001/122; E01H 2001/126; A01K 23/005; A01K 29/00; B65B 67/1205; B65B 67/1238; B65B 67/1255; B65F 1/1415
USPC .......... 294/1.3, 214; 248/99; 383/34
See application file for complete search history.

(56) References Cited

U.S. PATENT DOCUMENTS

| | | | | |
|---|---|---|---|---|
| 4,196,928 A | * | 4/1980 | Spangler | A01D 51/00 15/104.8 |
| 4,341,410 A | * | 7/1982 | Summach | E01H 1/1206 248/99 |
| 4,548,372 A | * | 10/1985 | Lutzker | A01D 51/00 141/390 |
| 5,033,780 A | * | 7/1991 | Wootten | B65F 1/0006 15/104.8 |
| 5,037,149 A | * | 8/1991 | Beck | E01H 1/1206 15/257.1 |
| 6,116,194 A | * | 9/2000 | Komarnitskiy | A01K 23/005 119/867 |
| 6,126,215 A | * | 10/2000 | Jahns | E01H 1/1206 294/1.3 |
| 6,471,267 B2 | * | 10/2002 | Asazuma | A01K 23/005 248/99 |
| 6,511,110 B2 | * | 1/2003 | Roye | B65L 367/1205 248/99 |
| 2014/0252002 A1 | * | 9/2014 | Donoghue | B65F 1/1415 220/495.09 |

* cited by examiner

*Primary Examiner* — Dean J Kramer

(57) ABSTRACT

The present invention discloses a disposable pet excrement collector including a triangular framework and an environmentally friendly paper bag. Connection edges are arranged on the sides of the opening of the paper bag, the connection edges are bent to form connection holes through adhesion with an outer side face of the paper bag, the triangular framework is in fixed connection with the opening of the paper bag through the connection holes, the triangular framework includes a first, second and third supporting rods, both ends of the third supporting rod are in movable connection with the first supporting rod and the second supporting rod respectively through a hinge, the hinge includes a first sleeve and a second sleeve, a neck is formed at an upper end of the first sleeve, and the second sleeve is movably installed in the neck through a connection shaft and the connection holes.

3 Claims, 2 Drawing Sheets

DISPOSABLE PET EXCREMENT COLLECTOR

TECHNICAL FIELD

The present invention relates to a pet excrement collector, and in particular to a disposable pet excrement collector.

BACKGROUND

One of the biggest environmental problems of keeping pets in cities is the cleaning of pet excrement, which is usually performed in the following manners. A reusable excrement picker is used, the long-term use cost of such a product is very low, but it is difficult to solve the product cleaning problem after excrement is picked up, and the reusable excrement picker is inconvenient to clean in time after being used outdoors, thereby being very unsanitary.

Disposable products with droppable parts are used, for example, some excrement pickers adopt the design of disposable excrement bags, but it is unavoidable to use a framework having certain strength to support the excrement bag, otherwise it is inconvenient to load the pet excrement, and such framework is usually relatively high in cost, but is not disposable. The use cost of such product is higher than that of the first type, but it is sanitary, however, the installation problem is not easy to solve, it is particularly inconvenient to take off the excrement bag, and a hand may be stained when taking off the used excrement bag, and it is not very convenient to take this framework on the hand all the time while walking a dog.

Paper, especially old newspaper is used. This method is the most environmentally friendly and the cost is the lowest, but now the social newspaper is used less and less because the use of mobile phones, and we no longer read the newspaper, so there is no old newspaper to use. Moreover, when the pet excrement is picked up by using the paper, the feeling transferred by the paper is uncomfortable, and the body feeling is bad.

SUMMARY

The technical problem to be solved by the present invention is to provide a disposable pet excrement collector to overcome the above defects.

In order to solve the above technical problems, the present invention provides the following technical solution.

The present invention provides a disposable pet excrement collector, including a triangular framework and an environmentally friendly paper bag, an opening of the environmentally friendly paper bag is of a triangular structure, connection edges are arranged on the sides of the opening of the environmentally friendly paper bag, the connection edges are bent to form connection holes through adhesion with an outer side face of the environmentally friendly paper bag, the triangular framework is in fixed connection with the opening of the environmentally friendly paper bag through the connection holes, the triangular framework is composed of a first supporting rod, a second supporting rod and a third supporting rod, both ends of the third supporting rod are in movable connection with the first supporting rod and the second supporting rod respectively through a hinge, the hinge is composed of a first sleeve and a second sleeve, a neck is formed at an upper end of the first sleeve, the second sleeve is movably installed in the neck through a connection shaft and the connection holes, two first sleeves are respectively sheathed on both ends of the third supporting rod, and two second sleeves are respectively sheathed on lower ends of the first supporting rod and the second supporting rod.

As a preferred technical solution of the present invention, the triangular framework is made of bamboo as the raw material.

As a preferred technical solution of the present invention, the hinge is made of degradable environmentally friendly plastic.

The present invention has the following beneficial effects: the product is made of materials that are all naturally degradable, thereby being environmentally friendly, the product is simple and smart in structure, can be used by a single hand, is low in cost, and can be entirely discarded after use. The pet excrement is not touched when and after the disposable pet excrement collector is used, so that the disposable pet excrement collector is clean and sanitary and good in body feeling, and is particularly friendly to the natural environment and the use environment.

BRIEF DESCRIPTION OF THE DRAWINGS

The drawings, which are merely used for providing a further understanding of the present invention and form a part of the specification, are used in conjunction with the embodiments of the present invention for explaining the present invention and do not constitute limitation to the present invention. In the drawings.

Reference signs: 1. triangular framework; 2. environmentally friendly paper bag; 3. hinge; 4. connection edge; 5. first supporting rod; 6. second supporting rod; 7. third supporting rod; 8. first sleeve; 9. neck; and 10. second sleeve.

DETAILED DESCRIPTION OF THE EMBODIMENTS

Preferred embodiments of the present invention will be described below with reference to the accompanying drawings, and it should be understood that the preferred embodiments described herein are merely used for illustrating and explaining the present invention, rather than limiting the present invention.

Embodiment 1

Figure 1:
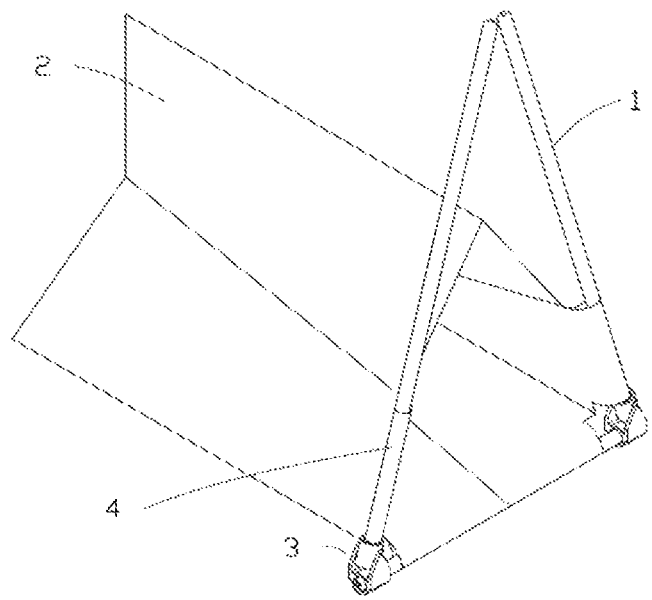
FIG. 1 is a structural schematic diagram of the present invention.
Figure 2:
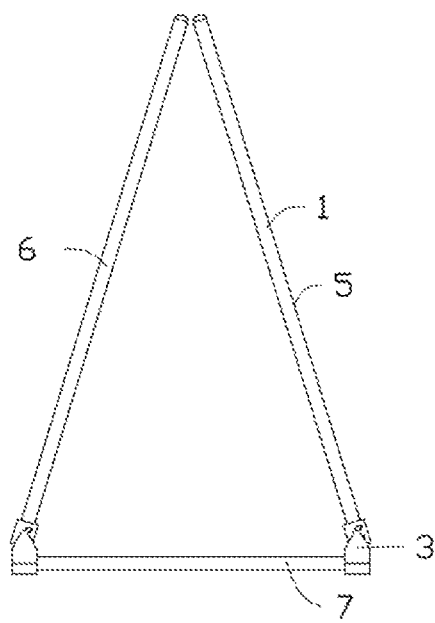
FIG. 2 is a structural schematic diagram of a triangular framework of the present invention.
Figure 3:
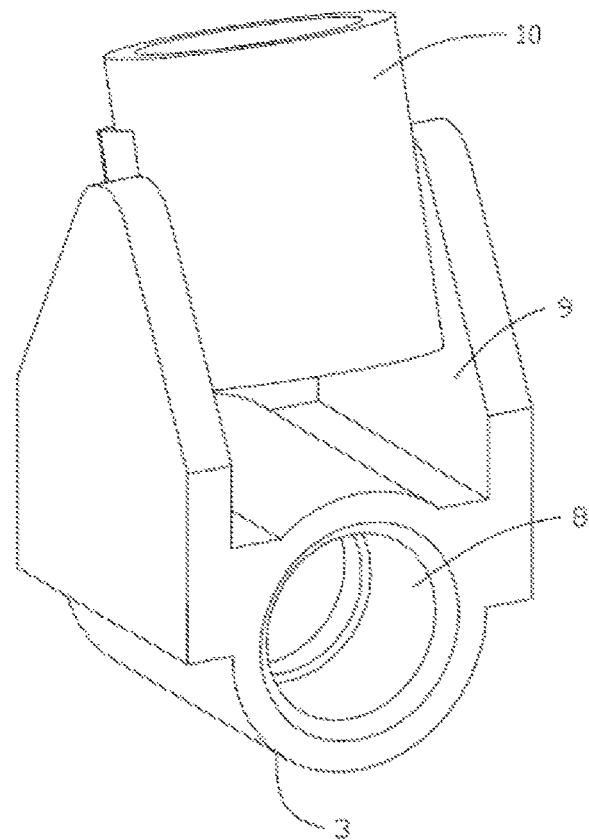
FIG. 3 is a structural schematic diagram of a hinge of the present invention.

As shown in FIG. 1 to FIG. 3, the present invention provides a disposable pet excrement collector, including a triangular framework 1 and an environmentally friendly paper bag 2, an opening of the environmentally friendly paper bag 2 is of a triangular structure, connection edges 4 are arranged on the sides of the opening of the environmentally friendly paper bag 2, the connection edges 4 are bent to form connection holes through adhesion with an outer side face of the environmentally friendly paper bag 2, the triangular framework 1 is in fixed connection with the opening of the environmentally friendly paper bag 2 through the connection holes, the triangular framework 1 is composed of a first supporting rod 5, a second supporting rod 6 and a third supporting rod 7, both ends of the third supporting rod 7 are in movable connection with the first supporting rod 5 and the second supporting rod 6 respectively through a hinge 3, the hinge 3 is composed of a first sleeve 8 and a second sleeve 10, a neck 9 is formed at an upper end of the first sleeve 8, the second sleeve 10 is movably installed in the neck 9 through a connection shaft and the connection holes, two first sleeves 8 are respectively sheathed on both ends of the third supporting rod 7, and two second sleeves 10 are respectively sheathed on lower ends of the first supporting rod 5 and the second supporting rod 6.

The triangular framework 1 is made of bamboo as the raw material, thereby being green and environmentally friendly, its manufacturing process is similar to the production of disposable chopsticks, therefore the triangular framework can be produced by using the existing production process and equipment of the existing disposable chopsticks, and thus the cost is relatively low. The hinge 3 is made of degradable environmentally friendly plastic, and as the hinge is naturally degradable, no environmental pollution is generated.

The specific working principle is as follows: the device is composed of the triangular framework 1 and the environmentally friendly paper bag 2, the triangular framework 1 is in fixed connection with the opening of the environmentally friendly paper bag 2, the top of the triangular framework 1 can be held to collect and treat the pet excrement by using the environmentally friendly paper bag 2, the pet excrement is not touched when and after the disposable pet excrement collector is used, thereby being clean and sanitary and good in body feeling; the triangular framework 1 is supported by the bamboo supporting rods and is composed of the hinges made of degradable plastic, thereby being green and the environmentally friendly, as the environmentally friendly paper bag is used as the excrement bag, the cost is low, the product can be entirely discarded after use, and all materials are naturally degradable, thereby being environmentally friendly.

The present invention has the following beneficial effects: the product is made of materials that are all naturally degradable, thereby being environmentally friendly, the product is simple and smart in structure, can be used by a single hand, is low in cost, and can be entirely discarded after use. The pet excrement is not touched when and after the disposable pet excrement collector is used, so that the disposable pet excrement collector is clean and sanitary and good in body feeling, and is particularly friendly to the natural environment and the use environment.

Finally, it should be noted that the above descriptions are only preferred embodiments of the present invention and are not intended to limit the present invention. Although the present invention has been described in detail with reference to the foregoing embodiments, those skilled in the art can still make modifications to technical solution recorded in the foregoing embodiments, or make equivalent substitutions to a part of technical features. Any modifications, equivalent substitutions, improvements and the like made within the spirit and principle of the present invention shall all fall within the protection scope of the present invention.

What is claimed is:

1. A disposable pet excrement collector, comprising a triangular framework (1) and an environmentally friendly paper bag (2), wherein an opening of the environmentally friendly paper bag (2) is of a triangular structure, connection edges (4) are arranged on the sides of the opening of the environmentally friendly paper bag (2), the connection edges (4) are bent to form connection holes through adhesion with an outer side face of the environmentally friendly paper bag (2), the triangular framework (1) is in fixed connection with the opening of the environmentally friendly paper bag (2) through the connection holes, the triangular framework (1) is composed of a first supporting rod (5), a second supporting rod (6) and a third supporting rod (7), both ends of the third supporting rod (7) are in movable connection with the first supporting rod (5) and the second supporting rod (6) respectively through a hinge (3), the hinge (3) is composed of a first sleeve (8) and a second sleeve (10), a neck (9) is formed at an upper end of the first sleeve (8), the second sleeve (10) is movably installed in the neck (9) through a connection shaft, two first sleeves (8) are respectively sheathed on both ends of the third supporting rod (7), and two second sleeves (10) are respectively sheathed on lower ends of the first supporting rod (5) and the second supporting rod (6).

2. The disposable pet excrement collector of claim 1, wherein the triangular framework (1) is made of bamboo as a raw material.

3. The disposable pet excrement collector of claim 1, wherein the hinge (3) is made of degradable environmentally friendly plastic.

\* \* \* \* \*